US006838017B1

(12) United States Patent  
Wu et al.

(10) Patent No.: US 6,838,017 B1
(45) Date of Patent: Jan. 4, 2005

(54) POLAR TOLANE LIQUID CRYSTALS

(75) Inventors: Shin-Tson Wu, Northridge, CA (US); Zheng Chai, Richardson, TX (US)

(73) Assignee: HRL Laboratories, LLC, Malibu, CA (US)

( * ) Notice: Subject to any disclaimer, the term of this patent is extended or adjusted under 35 U.S.C. 154(b) by 164 days.

(21) Appl. No.: 09/655,466

(22) Filed: Sep. 5, 2000

(51) Int. Cl.[7] .................. C09K 19/52; C09K 19/34; C07C 25/24; C07C 25/13; C07C 21/18

(52) U.S. Cl. ................ 252/299.01; 252/299.61; 570/127; 570/128; 570/153

(58) Field of Search .............. 252/299.01, 299.61, 252/299.63, 299.66; 570/127, 128, 153, 129; 428/1.1

(56) References Cited

U.S. PATENT DOCUMENTS

| | | | |
|---|---|---|---|
| 5,151,213 A |  | 9/1992 | Reiffenrath et al. |
| 5,242,618 A | * | 9/1993 | Krause et al. ............ 252/299.6 |
| 5,314,640 A | * | 5/1994 | Yamada .................... 252/299.6 |
| 5,338,481 A |  | 8/1994 | Wu et al. |
| 5,356,558 A |  | 10/1994 | Yamada et al. |
| 5,453,864 A | * | 9/1995 | Yamada et al. ............. 349/182 |
| 6,149,837 A |  | 11/2000 | Sekine et al. ............ 252/299.6 |

FOREIGN PATENT DOCUMENTS

| | | |
|---|---|---|
| DE | 4111990 | 10/1991 |
| DE | 4105742 | 8/1992 |
| EP | 0442266 | 8/1991 |
| EP | 0581272 | 2/1994 |
| EP | 0648723 | 4/1995 |
| JP | 8-209130 | * 8/1996 |
| JP | 9-255954 | * 9/1997 |
| JP | 10-45642 | * 2/1998 |

OTHER PUBLICATIONS

CAPLUS 1993: 59406.*
http://www6.ipdl.jpo.go.jp/Tokujitu/PAJdetail.ipdl?N0000=60&N0120=01&N2001=2&N3001=H10–1045642 for English translation by Japan Patent Office.*
http://www6.ipdl.jpo.go.jp/Tokujitu/PAJdetail.ipdl?N0000=60&N0120=01&N2001=2&N3001=H08–209130 for English translation by Japan Patnet Office.*
http://www6.ipdl.jpo.go.jp/Tokujitu/PAJdetail.ipdl?N0000=60&N0120=01&N2001=2&N3001=H09–255954 for English translation by Japan Patnet Office.*
Database WPI Section Ch, Week 199348 Derwent Publication Ltd., London, GB; AN 1993–383033 XP002192887.
Bremer, Matthias, et al., Gas phase molecular modeling of liquid crystal: electro–optical anisotropies: Adv. Mater. (Weinheim, Fed. Repub. Ger.) (1993), 5(11), 842–8, 1993, XP000414825.

Database CA Online! Chemical Abstracts Service, Columbus, Ohio, US; Takeuchi, Kiyobumi et al: "Nematic liquid crystal compositions and liquid—crystal display devices containing them" retrieved from STN Database accession No. 127:115344 CA XP002192882.
Database CA Online! Chemical Abstract Service, Columbus, Ohio, US; Oosawa, Masashi et al: "1–(4–Cyclohexlpheny1)–2–phenylethane derivative for liquid crystal display device" retrieved from STN Database accession No. 125:22403 CA XP002192883.

(List continued on next page.)

Primary Examiner—Shean C Wu
(74) Attorney, Agent, or Firm—Tope-McKay & Associates

(57) ABSTRACT

New tolane and bis-tolane compounds:

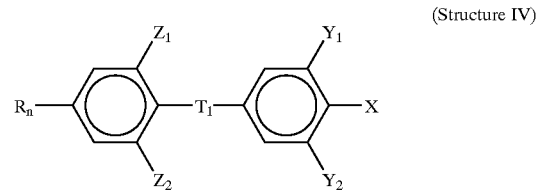

(Structure IV)

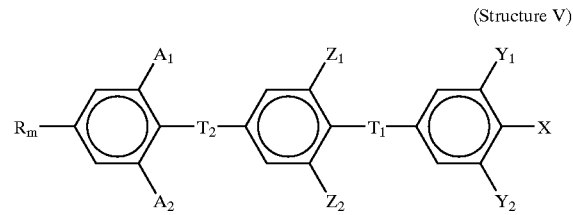

(Structure V)

in which X is F (fluoro), CN (cyano), $OCF_3$ (trifluoromethoxy), or NCS (isothiocyanate) at least one of the pairs $Y_1$ and $Y_2$, $Z_1$ and $Z_2$, and $A_1$ and $A_2$ are fluoro groups.

$T_1$ for the tolanes is a triple bond. For the bis-tolane $T_1$ and $T_2$ are either both triple bonds or one of the two groups is a double bond.

$R_n$ or $R_m$ may be an alkyl group, and alkenyl group, and alkoxy group, or an alkenoxy group. For the tolane compounds, $R_n$ may be a:

dioxane substituent:

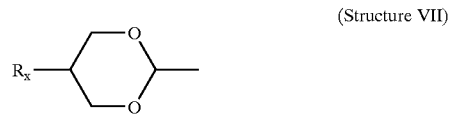

(Structure VII)

in which $R_x$ may be as $R_n$ or $R_m$ above.

These compounds exhibit useful nematic ranges and melting points. Also disclosed are eutectic mixtures including these compounds.

23 Claims, No Drawings

OTHER PUBLICATIONS

Database CA Online! Chemical Abstracts Service, Columbus, Ohio, US; Nakada, Hidetoshi et al: "Manufacture of liquid—crystal device having light–controlling layer from composition with controlled specific resistance" retrived from STN Database accession No. 127:26381 CA XP002192884.

Database CA Online! Chemical Abstracts Service, Columbus, Ohio, US; Osawa et al.:"liquid–crystalline characteristic diacetylene compound with high dielectric anisotropy" retrieved from STN Database accession No. 128:186837 CA XP002192885.

Tanaka, Toshihiko et al.: "Highly anisotropic molecular materials for LCD" Molecular Crystals and Liquid Crystals Science and Technology, Section A: Molecular Crystals and Liquid Crystals (2000), 346, 209–216, 2000, XP008001341.

B. Grant, N.J. Clecak, and R.J. Cox, "Novel Liquid Crystalline Materials", Mol. Cryst. Liq. Cryst., 1979, vol. 51, pp. 209–214, 1979.

B. Grant, "Diacetylenic Liquid Crystals", Mol. Cryst. Liq. Cryst., 1978, vol. 48, pp. 175–182, 1978.

S.T. Wu, J.D. Margerum, H.B. Meng, C.S. Hsu, and L.R.Dalton, "Potenial liquid crystal mixtures for Co2 laser application", Appl., Phys., Lett. 64(10), Mar. 7, 1994.

Demus et al., "Trifluorinated Liquid Crystals for TFT Displays," Mol. Cryst. Liq. Cryst. 260, 1–21 (1995).

Shin–Tson Wu et al, Room–temperature diphenyl–diacetylene liquid crystals, Appl. Phys. Lett. 61 (6), Aug. 10, 1992, pp 630–632, American Institute of Physics, USA.

Shin–Tson Wu et al, High birefringence and wide nematic range bis–tolane liquid crystals Appl. Phys. Lett.74 (3), Jan. 18, 1999, pp 344–346, American Institute of Physics, USA.

Shin–Tson Wu et al, Physical Properties of Bis–Tolane Liquid Crystals Jpn. J. Appl. Phys. 39 (2000), Jan. 15, 2000, pp L38–L41, Japanese Journal of Applied Physics, Japan.

Shin–Tson Wu et al, Fluoro diphenyldiacetylene and tolane liquid crystals for display application Optical Engineering, 32 (8), Aug. 1993, pp 1792–1797, Society of Photo–Optical Inst. Engrs., USA.

Shin–Tson Wu et al, Fluorinated diphenyl–diacetylene and tolane liquid crystals with low threshold voltage Appl. Phys. Lett 61 (19), Nov. 9, 1992, pp 2275–2277, American Institute of Physics, USA.

H.–H. B. Meng et al, Synthesis and Physical Properties of Asymmetric Diphenyldiacetylenic Liquid Crystals Mol. Cryst. Liq. Cryst., 250 (1994), 1994, pp 303–314, Gorden and Breach Science Publishers S.A., USA.

Kuen–Torng Tsay et al, Synthesis of Asymetric Tolane Liquid Crystals for Display Application SPIE, 3421 (0277–786X/98), Jul. 1998, pp 142–150, SPIE, Taipei, Taiwan.

* cited by examiner

POLAR TOLANE LIQUID CRYSTALS

FIELD OF THE INVENTION

The present invention relates to liquid crystal materials and eutectic mixtures thereof. In particular, the invention is directed to a new class of polar asymmetric tolane derivatives and eutectic liquid crystal mixtures containing the derivatives with infrared and microwave applications.

BACKGROUND OF THE INVENTION

Liquid crystals that have high birefringence, low viscosity, and low threshold voltage, and are capable of maintaining a nematic phase over a broad temperature range are desirable in electro-optic phase and amplitude modulation applications. Such applications include infrared light valves, polymer-dispersed liquid crystals and cholesteric displays. High birefringence, or optical anisotropy ($\Delta n$), of the liquid crystal composition improves the efficiency of light modulation, and low rotational viscosity serves to shorten the response times. Low threshold voltage, which is inversely related to the dielectric anisotropy of the liquid crystal material, simplifies the electronics that drive the application.

Polar liquid crystal compounds, particularly fluorinated species, have been investigated as possible candidates for such electro-optics applications. In general, fluorinated liquid crystal compounds have desirably low rotational viscosity, excellent photostability and high resistivity. However, they also tend to exhibit modest dielectric anisotropy and, accordingly, high threshold voltage.

Increasing the asymmetry and, accordingly, the polarity of such compounds has been proposed as a means to improve the dielectric anisotropy of these compounds. Wu, et al. [Opt. Eng. 32, 1792–7 (1993)], for example, reported polar fluorinated diphenyldiacetylenes and tolanes as shown in Structures I and II below, respectively

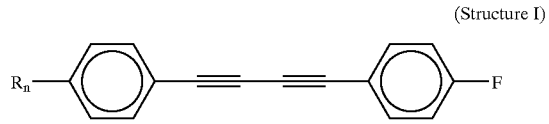

(Structure I)

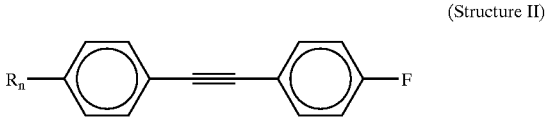

(Structure II)

These compounds exhibit high birefringence, high resistivity, low viscosity, and comparatively low threshold voltage. However, while in some cases these compounds have reasonably low melting temperatures and heat fusion enthalpies, as is typical of compounds with high dipole moments, the melting temperature is too high and the nematic phase is too narrow.

The fluorination of polytolane liquid crystal compounds has also been investigated. In general, the highly conjugated polytolanes have desirably high birefringence. Fluorinated bis-tolanes such as shown in structure III, have been reported.

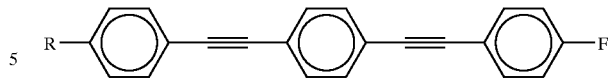

(Structure III)

While this type of compound has good dielectric anisotropy, utility is limited, once again, due to high melting point and narrow nematic range.

SUMMARY OF THE INVENTION

A new class of liquid crystal compounds is provided which provides improved melting points and broader nematic ranges compared to previously reported fluorinated liquid crystal compounds. Specifically, the present invention provides a class of compounds based on the tolane and bis-tolane structures as shown in Structures IV and V.

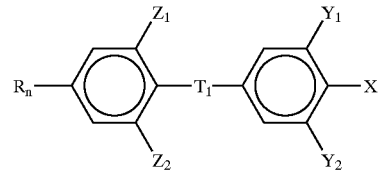

(Structure IV)

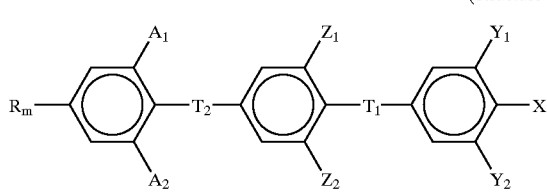

(Structure V)

For the compounds depicted in all of the above structures and described herein, a polar group such as F (fluoro), CN (cyano), $OCF_3$ (trifluoromethoxy), or NCS (isothiocyanate) is positioned at site X and fluoro groups are positioned at least one of the pairs of sites $Y_1$ and $Y_2$, $Z_1$ and $Z_2$, and for the bis-tolane derivatives, $A_1$ and $A_2$.

For the tolane derivatives as depicted in structure IV, $T_1$ is always a triple bond. For the bis-tolane derivatives, $T_1$ and $T_2$ are either both triple bonds or one of the two groups is a double bond with and the other remains a triple bond.

In this new class of compounds, $R_n$ or $R_m$ may be an alkyl group having the general formula $C_nH_{2n+1}$, an alkenyl group having the general formula $C_nH_{2n-1}$, an alkoxy group having the general formula $OC_nH_{2n+1}$, or an alkenoxy group having the general formula —$OC_nH_{2n-1}$. Additionally, for the tolane compounds depicted in structure IV, $R_n$ may be a cyclohexyl substituent as shown in Structure VI

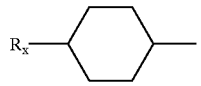

(Structure VI)

or a dioxane substituent as shown in Structure VII.

(Structure VII)

For both types of substituents, $R_x$ may be an alkyl group having the general formula general formula $-C_xH_{2x+1}$, an alkenyl group having the general formula $-C_xH_{2x-1}$, an alkoxy group having the general formula $-OC_xH_{2x+1}$, or an alkenoxy group having the general formula $-OC_xH_{2x-1}$.

DETAILED DESCRIPTION OF THE INVENTION

The present invention relates to a new class of liquid crystal materials and eutectic mixtures thereof and a method for their synthesis. It is anticipated that the invention may be tailored to a variety of other applications. The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

The present invention relates, generally, to fluorinated polar asymmetric liquid crystal compound, a method for their preparation, and their use in eutectic mixtures. In certain embodiments of this invention, tolane compounds are provided of the type depicted in Structure VIII:

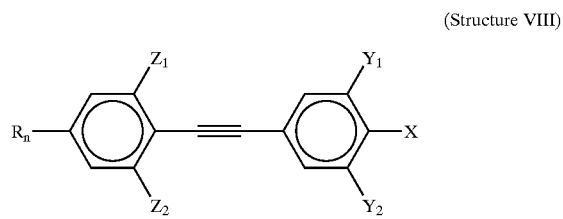
(Structure VIII)

wherein X is a polar group such as F (fluoro), CN (cyano), $OCF_3$ (trifluoromethoxy), or NCS (isothiocyanate), and at least one of the pairs $Y_1$ and $Y_2$ and $Z_1$ and $Z_2$ are fluoro groups. In these embodiments, $R_n$ may be an alkyl group having the general formula $C_nH_{2n+1}$, an alkenyl group having the general formula $C_nH_{2n-1}$, an alkoxy group having the general formula $OC_nH_{2n+1}$, or an alkenoxy group having the general formula $OC_nH_{2n-1}$. For these substituents, the value of n is preferably approximately 2 to 12. Additionally, $R_n$ may be a substituent of the type shown in Structure VI,

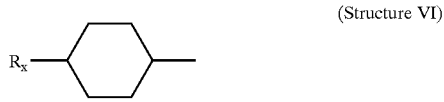
(Structure VI)

wherein $R_x$ is an alkyl group having the general formula $C_xH_{2x+1}$, an alkenyl group having the general formula $C_xH_{2x-1}$, an alkoxy group having the general formula $OC_xH_{2x+1}$, or an alkenoxy group having the general formula $OC_xH_{2x-1}$. The value of x is preferably 2 to 12. In yet another alternative, $R_n$ may be a substituent of the type shown in Structure VII,

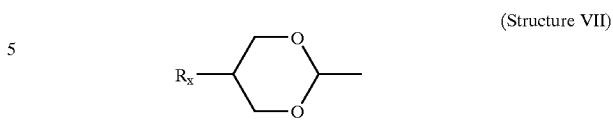
(Structure VII)

wherein again $R_x$ may be an alkyl group having the general formula $C_xH_{2x+1}$, an alkenyl group having the general formula $C_xH_{2x-1}$, an alkoxy group having the general formula $OC_xH_{2x+1}$, or an alkenoxy group having the general formula $OC_xH_{2x-1}$. Again, the value of x is preferably approximately 2 to 12.

In other, preferred embodiments of this invention, bis-tolane compounds are provided as shown in structure IX,

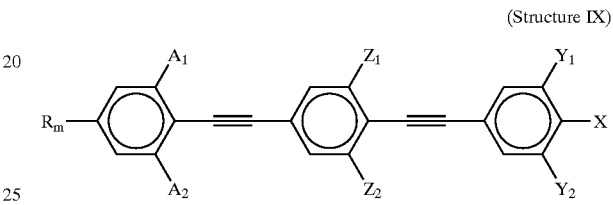
(Structure IX)

wherein X is a polar group such as F (fluoro), CN (cyano), OCF3(trifluoromethoxy), or NCS (isothiocyanate), and at least one of the pairs $Y_1$ and $Y_2$, $Z_1$ and $Z_2$, and $A_1$ and $A_2$ are fluoro groups. In this embodiment, $R_m$ may be an alkyl group having the general formula $C_mH_{2m+1}$, an alkenyl group having the general formula $C_mH_{2m-1}$, an alkoxy group having the general formula $OC_mH_{2m+1}$, or an alkenoxy group having the general formula $OC_mH_{2m-1}$. The value of m is preferably approximately 2 to 12.

One example of this embodiment, wherein $R_m$ is an alkyl group with m=4, is depicted for clarity in structure X and will henceforth be referred to as PTPTP-4FFF.

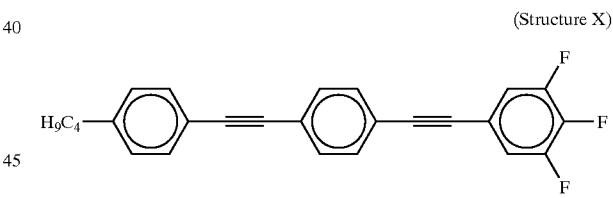
(Structure X)

This trifluoro bis-tolane compound has a nematic range of 115 to 188.1° C. and a heat fusion enthalpy of 3.85 kcal/mol. In comparison, the monofluoro compound, henceforth referred to as PTPTP-4F, and depicted in structure XI,

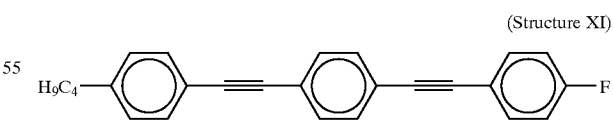
(Structure XI)

has a nematic range of 173.1 to 217.2° C. and a heat fusion enthalpy of 8.47 kcal/mol. The addition of the fluoro groups meta to the tolane triple bond serves to reduce both the melting and clearing points of the compound and accordingly reduce the heat fusion enthalpy. Further, in contrast to PTPTP-4F, the reduced melting point of the PTPTP-4FFF species renders it useful in eutectic mixtures.

In yet other embodiments, modified bis-tolane structures of the types depicted in Structures XII and XIII are provided:

(Structure XII)

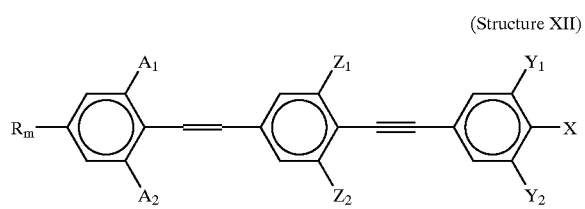

(Structure XII)

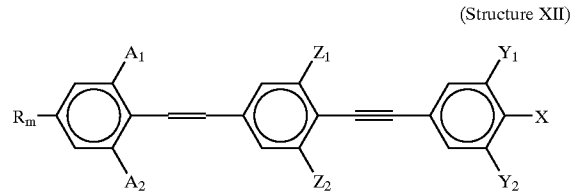

(Structure XIII)

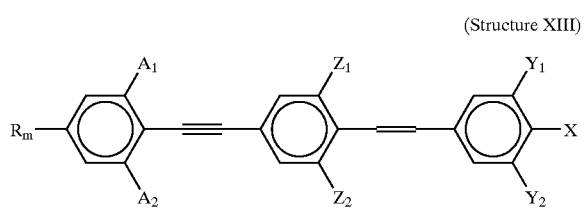

(Structure XIII)

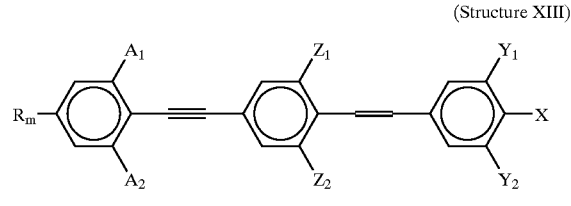

wherein X is a polar group such as F (fluoro), CN (cyano), OCF$_3$ (trifluoromethoxy), or NCS (isothiocyanate), and either the pair Y$_1$ and Y$_2$, the pair Z$_1$ and Z$_2$, or the pair A$_1$ and A$_2$ are fluoro groups and the alternate pairs are hydrogens. In this embodiment, R$_m$ may be an alkyl group having the general formula C$_m$H$_{2m+1}$, an alkenyl group having the general formula C$_m$H$_{2m-1}$, an alkoxy group having the general formula OC$_m$H$_{2m+1}$, or an alkenoxy group having the general formula OC$_m$H$_{2m-1}$. The value of m is preferably approximately 2 to 12.

For preferred embodiments of the tolanes provided by the present invention as shown in structure VIII, (Structure VIII)

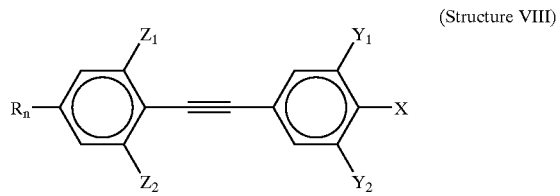

the R$_n$ substituent is an alkenyl group having the general formula C$_n$H$_{2n-1}$, and more preferably an alkenyl group with the double bond in the second position and having the general formula C$_x$H$_{2x+1}$CH=CH—CH$_2$—. Similarly for the bis-tolanes and modified bis-tolane derivatives shown structures IX, XII, and XIII, (Structure IX)

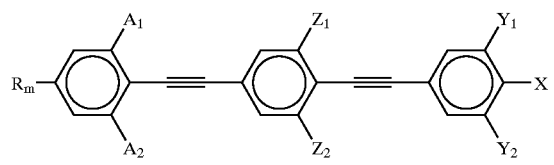

R$_m$ is preferably an alkenyl group with the general formula C$_m$H$_{2m-1}$, and more preferably an alkenyl with the double bond in the second position and having the general formula C$_x$H$_{2x+1}$CH=CH—CH$_2$—. Furthermore, for the tolanes, bis-tolanes, and modified bis-tolanes provided herein, fluoro substitution at the X, Y$_1$, and Y$_2$ positions is preferred.

Generally, the compounds provided in the present invention have large dipole moments that contribute to desirably high dielectric anisotropy. However, the positioning of the additional fluoro groups helps to reduce the high melting points characteristic of polar tolane and bis-tolane compounds. Modified bis-tolane structure XIII is shown here for reference.

(Structure XIII)

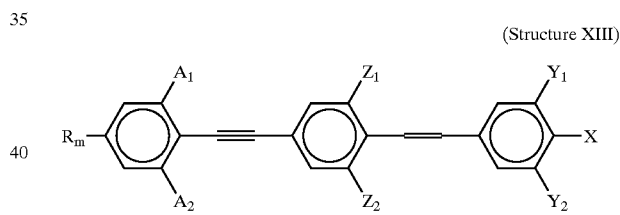

However, the principles presented herein apply to all embodiments of the present invention. It should be apparent to one skilled in the art that placing fluoro groups in at least one pair of the Y$_1$, Y$_2$, or Z$_1$, Z$_2$, or A$_1$, A$_2$ paired positions in the above structure not only contributes to the overall dipole of the molecule but also serves to increase the effective molecular distance between molecules in the bulk phase. Increasing the intermolecular distance results in a decrease in melting point and heat fusion enthalpy.

For the modified bis-tolane embodiments of the present invention, reduction of one of the bis-tolane triple bonds to a double bond as shown in structures XII and XIII (Structure XII)

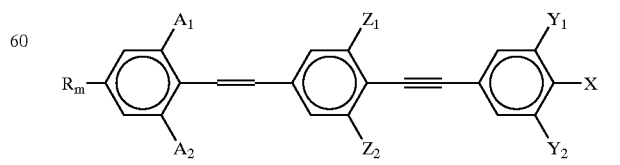

(Structure XIII)

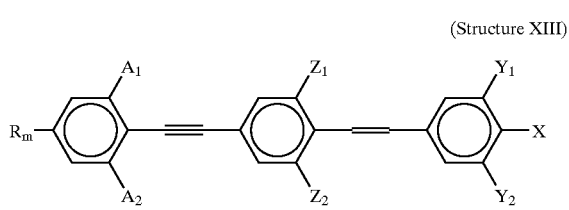

introduces a bend into the molecular structure. This bend, like the pairs of fluoro substituents, serves to increase the intermolecular distance in the bulk phase. Thus, the reduction of one of the triple bonds in the bis-tolane structure results in a lower melting point and heat fusion enthalpy for the compound.

In additional embodiments of the present invention, the compounds provided herein are utilized as components of eutectic mixtures. In general, compounds such as those depicted in structure XIV (Structure IV)

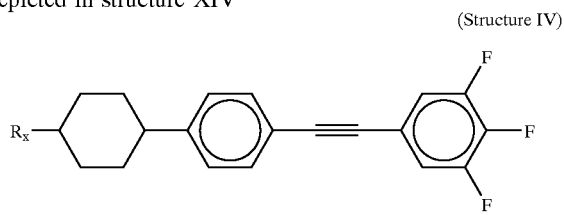

are particularly effective due to low melting point and wide nematic range. Compounds such as PTPTP-4FFF and the class of compounds depicted in Structure XV, (Structure XV)

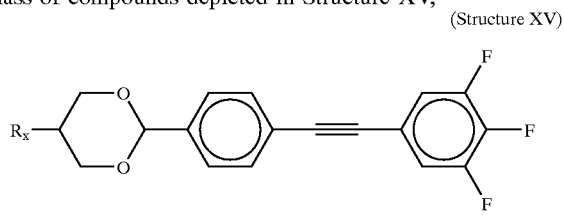

while having relatively high melting points and limited nematic phases, are nonetheless useful as dopants for increasing the dielectric anisotropy of eutectic mixtures. Compounds of the type shown in structure XV, in particular, have very high dipole moments and accordingly large dielectric anisotropy values.

General procedures for the preparation of embodiments of this invention are provided in Schemes 1 and 2. Scheme 1 outlines particularly the synthesis of the tolane compounds (4), and Scheme 2 outlines particularly the bis-tolane variants (11). A detailed description of a synthesis example compound PTPTP-4FFF according to Scheme 2 is provided below. It will be readily apparent to one skilled in the art that the synthesis for PTPTP-4FFF described herein can be readily adapted, as outlined in Schemes 1 and 2, to produce other variants of the present invention. Appropriate selection of reactants, such as substituted benzenes, as outlined in the Schemes below will provide the desired products according to the present invention.

To a mixture of (trimethylsilyl)acetylene 1a (5.0 g, 51 mmol) and 1-butyl-4-iodobenzene 5 (10.6 g, 46 mmol) was added the catalyst system of Pd(PPh$_3$)Cl$_2$ (800 mg, 1.2 mmol) and CuI (220 mg, 1.2 mmol) followed by anhydrous tetrahydrofuran (50 mL). The mixture was kept under an Ar atmosphere and cooled with an ice-bath. Triethylamine (10 mL, 72 mmol) was added to the mixture through a syringe over 5 minutes and the orange solution was stirred for 1.5 hours while the ice-bath warmed up. The resulting dark solution was diluted with pentane and washed with 10% HCl, saturated NaHCO$_3$, and brine, successively. The organic layer was dried with Na$_2$SO$_4$, concentrated and passed through a plug of silica gel. Evaporation of solvent gave the trimethylsilyl acetylene derivative 6 as a clear oil (9.2 g, 100%).

To 6 (m=4) (9.2 g, 46 mmol) was added a solution of NaOH (4 g, 100 mmol) in a mixed solvent of H$_2$O (8 mL), THF (8 mL) and MeOH (8 mL). The mixture was stirred at room temperature for 17 hours. It was then diluted with hexanes and washed with 10% HCl, saturated NaHCO$_3$ and brine, successively. The organic layer was dried with Na$_2$SO$_4$, concentrated and passed through a plug of silica gel. Evaporation of solvent gave the unsubstituted acetylene compound 7 as a clear oil(5.5 g, 93%).

To an ice-bath-cooled mixture of 7 (m=4) (1.88 g, 11.9 mmol), 1-bromo-4-iodobenzene 7a (3.06 g, 10.8 mmol), Pd(PPh$_3$)Cl$_2$ (209 mg, 0.3 mmol) and CuI (57 mg, 0.3 mmol) were added tetrahydrofuran (12 mL) followed by triethylamine (5 mL). The mixture was stirred for 24 hours at room temperature. The precipitates were removed by vacuum filtration and the filtrate was diluted with pentane. The organic layer was washed with 10% HCl, saturated NaHCO$_3$ and brine, successively. After drying with MgSO$_4$, concentration and filtration through silica gel, the brominated tolane 8 was obtained as a yellow solid (3.22 g, 95%).

To a solution of 8 (m=4) (743 mg, 2.4 mmol), Pd(PPh$_3$)Cl$_2$ (28 mg, 0.01 mmol), CuI (5 mg, 0.01 mmol) and PPh$_3$ (10 mg, 0.01 mmol) in triethylamine (10 mL) was added (trimethylsilyl)acetylene (500 µL, 3.6 mmol). The solution was refluxed under Ar for 1.5 hours and then cooled to room temperature. Hexane extracts of the mixture were washed with 10% HCl, saturated NaHCO$_3$, and brine, successively. The solution was dried with Na$_2$SO$_4$ and concentrated. The crude oil was subject to column chromatography to give a yellowish solid (604 mg, 84%) as the pure trimethylsilyl acetylene derivative 9.

To a solution of 9 (m=4) (430 mg, 1.3 mmol) in the mixed solvent of tetrahydrofuran (6 mL) and ethanol (6 mL) was added 1 g of Dowex® 550A OH anion-exchange resin.

The mixture was stirred at room temperature for 18 hours. After the resin was filtered, the solution was concentrated and filtered through silica gel (hexanes as eluent). Evaporation of solvent gave the unsubstituted acetylene derivative 10 as a yellow solid (350 mg, 100%).

To a mixture of 10 (n=4) (182 mg, 1 mmol) and 1-bromo-3,4,5-trifluorobenzene 10a (211 mg, 1 mmol) was added Pd(PPh$_3$)$_4$ (12 mg, 0.01 mmol), CuI (2 mg, 0.01 mmol) and PPh$_3$ (4 mg, 0.01 mmol) followed by triethylamine (5 mL). The mixture was refluxed under Ar for 2 hours and cooled down to room temperature. It was then diluted with hexanes, filtered through silica gel and concentrated. Column chromatography of the crude oil gave the pure bis-tolane product 11 as a clear oil (80%).

Scheme 1

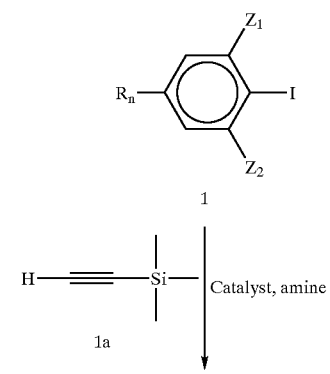

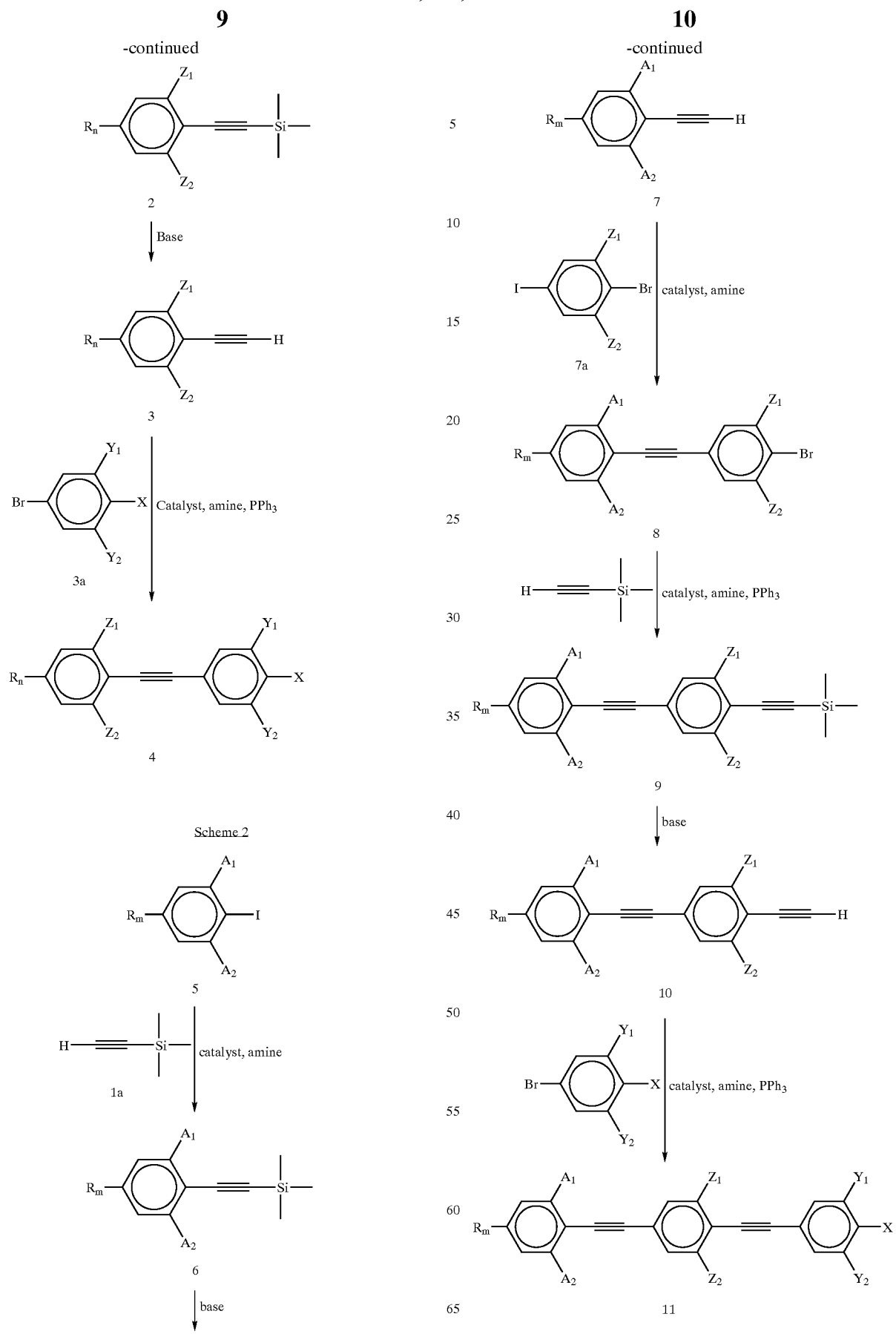

What is claimed is:

1. Liquid crystal compounds having the general structure:

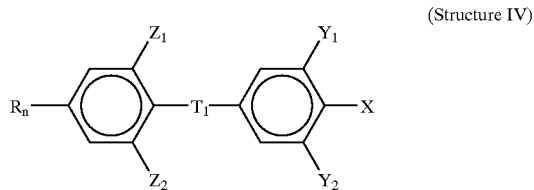

(Structure IV)

wherein

X is NCS (isothiocyanate);

$T_1$ is a triple bond;

$Y_1$ and $Y_2$ are a pair of substituents selected from the group consisting of H and F, and $Y_1=Y_2$;

$Z_1$ and $Z_2$ are a pair of substituents selected from the group consisting of H and F, and $Z_1=Z_2$; and, at least one of the pairs $Y_1$ and $Y_2$ and $Z_1$ and $Z_2$ are substituted with F;

Rn is selected from the group consisting of an alkyl group having the general formula $C_nH_{2n+1}$, an alkenyl group having the general formula $C_nH_{2n-1}$, an alkoxy group having the general formula $OC_nH_{2n+1}$, an alkenoxy group having the general formula $OC_nH_{2n-1}$, and a group of the general structure

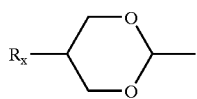

(Structure VII)

wherein $R_x$ is selected from a group consisting of an alkyl group having the general formula $C_xH_{2x+1}$, an alkenyl group having the general formula $C_xH_{2x-1}$, an alkoxy group having the general formula $OC_xH_{2x+1}$, and an alkenoxy group having the general formula $OC_xH_{2x-1}$; and, wherein n is an integer greater than 0 and x is an integer greater than 0.

2. A liquid crystal compound as set forth in claim 1, wherein $R_n$ is selected from a group consisting of an alkyl group having the general formula $C_nH_{2n+1}$, an alkenyl group having the general formula $C_nH_{2n-1}$, an alkoxy group having the general formula $OC_nH_{2n+1}$, and an alkenoxy group having the general formula $OC_nH_{2n-1}$ where n is approximately 2 to 12.

3. A liquid crystal compound as set forth in claim 1, wherein $R_x$ is selected from a group consisting of an alkyl group having the general formula $C_xH_{2x+1}$, an alkenyl group having the general formula $C_xH_{2x-1}$, an alkoxy group having the general formula $OC_xH_{2x+1}$, and an alkenoxy group having the general formula $OC_xH_{2x-1}$ where x is approximately 2 to 12.

4. A liquid crystal compound as set forth in claim 1, wherein $R_n$ is an alkenyl group having the general formula $C_nH_{2n-1}$.

5. A liquid crystal compound as set forth in claim 1, wherein $R_n$ is an alkenyl group having the general formula $C_nH_{2n-1}$ where n ranges approximately from 2 to 12.

6. Liquid crystal compounds having the general structure:

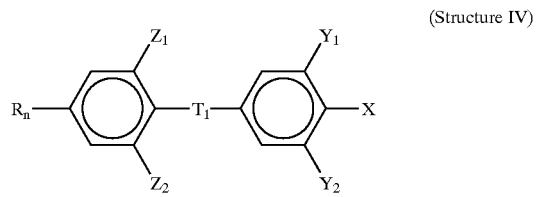

(Structure IV)

wherein

X is NCS (isothiocyanate);

$T_1$ is a triple bond;

$Y_1$ and $Y_2$ are a pair of substituents selected from the group consisting of H and F, and $Y_1=Y_2$;

$Z_1$ and $Z_2$ are a pair of substituents selected from the group consisting of H and F, and $Z_1=Z_2$; and, at least one of the pairs $Y_1$ and $Y_2$ and $Z_1$ and $Z_2$ are substituted with F;

Rn is selected from the group consisting of an alkyl group having the general formula $C_xH_{2x+1}CH=CH-(CH_2)-$, an alkenyl group having the general formula $C_xH_{2x+1}CH=CH-(CH_2)-$, an alkoxy group having the general formula $OC_nH_{2n+1}$, an alkenoxy group having the general formula $OC_nH_{2n-1}$, and a group of the general structure

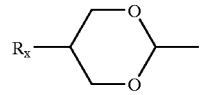

(Structure VII)

wherein $R_x$ is selected from a group consisting of an alkyl group having the general formula $C_xH_{2x+1}$, an alkenyl group having the general formula $C_xH_{2x-1}$, an alkoxy group having the general formula $OC_xH_{2x+1}$, and an alkenoxy group having the general formula $OC_xH_{2x-1}$;

wherein n is an integer greater than 0 and x is an integer greater than 0; and.

7. Liquid crystal compounds having the general structure

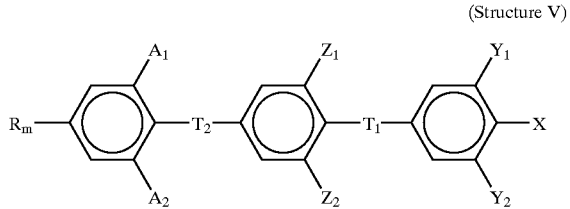

(Structure V)

wherein

X is selected from the group consisting of F (fluoro), $OCF_3$ (trifluoromethoxy), and NCS (isothiocyanate);

$T_1$ is selected from the group consisting of a triple and a double covalent bond between two carbons;

$T_2$ is selected from the group consisting of a triple and a double covalent bond between two carbons; and, $T_1$ is not equal to $T_2$ when $T_1$ or $T_2$ is a double bond;

$Y_1$ and $Y_2$ are a pair of substituents selected from the group consisting of H and F and $Y_1=Y_2$;

$Z_1$ and $Z_2$ are a pair of substituents selected from the group consisting of H and F and $Z_1=Z_2$;

$A_1$ and $A_2$ are a pair of substituents selected from the group consisting of H and F and $A_1=A_2$;

at least one of the pairs $Y_1$ and $Y_2$, $Z_1$ and $Z_2$, and $A_1$ and $A_2$ is substituted with F; and, $R_m$ is selected from the group consisting of an alkyl group having the general formula $C_mH_{2m+1}$, an alkenyl group having the general formula $C_mH_{2m-1}$, an alkoxy group having the general formula $OC_mH_{2m+1}$, and an alkenoxy group having the general formula $OC_mH_{2m-1}$, wherein m is an integer greater than 0; and, wherein when $T_1$ and $T_2$ are both triple bonds and $R_m$ is an alkyl group, one and only one of the pairs $Y_1$ and $Y_2$, $Z_1$ and $Z_2$, and $A_1$ and $A_2$ is substituted with F.

8. A liquid crystal compound as set forth in claim 7, wherein X is a substituted with F;

$Y_1$ and $Y_2$ are substituted with F; and, $Z_1$ and $Z_2$ and $A_1$ and $A_2$ are H groups.

9. A liquid crystal compound as set forth in claim 7, wherein $T_1$ and $T_2$ are triple bonds between two carbons.

10. A liquid crystal compound as set forth in claim 7, wherein $R_m$ is selected from a group consisting of an alkyl group having the general formula $C_mH_{2m+1}$, an alkenyl group having the general formula $C_mH_{2m-1}$, an alkoxy group having the general formula $OC_mH_{2m+1}$, and an alkenoxy group having the general formula $OC_mH_{2m-1}$ where m is approximately 2 to 12.

11. A liquid crystal compound as set forth in claim 7, wherein $R_m$ is an alkenyl group having the general formula $C_mH_{2m-1}$.

12. A liquid crystal compound as set forth in claim 7, wherein $R_m$ is an alkenyl group having the general formula $C_mH_{2m-1}$ where m ranges approximately from 2 to 12.

13. A liquid crystal compound as set forth in claim 7, wherein $R_m$ is an alkenyl group having the general formula $C_mH_{2m+1}CH=CH-(CH_2)-$.

14. A eutectic mixture of liquid crystal compounds comprising at least two liquid crystal compounds, including at least one compound having the general structure

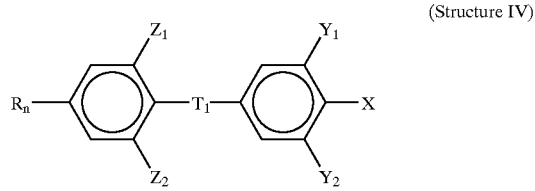

(Structure IV)

wherein

X is NCS (isothiocyanate);

$T_1$ is a triple bond;

$Y_1$ and $Y_2$ are a pair of substituents selected from the group consisting of H and F and $Y_1=Y_2$;

$Z_1$ and $Z_2$ are a pair of substituents selected from the group consisting of H and F and $Z_1=Z_2$;

at least one of the pairs $Y_1$ and $Y_2$ and $Z_1$ and $Z_2$ are substituted with F;

$R_n$ is selected from the group consisting of an alkyl group having the general formula $C_nH_{2n+1}$, an alkenyl group having the general formula $C_nH_{2n-1}$, an alkoxy group having the general formula $OC_nH_{2n+1}$, an alkenoxy group having the general formula $OC_nH_{2n-1}$, and a group of the general structure

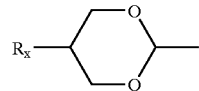

(Structure VII)

wherein $R_x$ is selected from a group consisting of an alkyl group having the general formula $C_xH_{2x+1}$, an alkenyl group having the general formula $C_xH_{2x-1}$, an alkoxy group having the general formula $-OC_xH_{2x+1}$, and an alkenoxy group having the general formula $-OC_xH_{2x-1}$; and, wherein n is an integer greater than 0 and x is an integer greater than 0.

15. A eutectic mixture of liquid crystal compounds comprising at least two liquid crystal compounds including at least one compound having the general structure

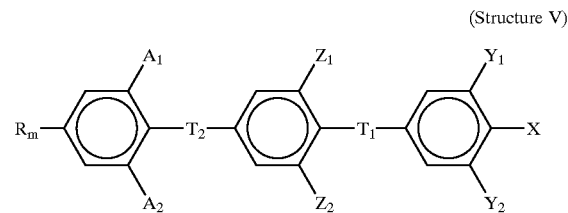

(Structure V)

wherein

X is selected from the group consisting of F (fluoro), $OCF_3$(trifluoromethoxy), and NCS (isothiocyanate);

$T_1$ is selected from the group consisting of a triple and a double covalent bond between two carbons;

$T_2$ is selected from the group consisting of a triple and a double covalent bond between two carbons; and, $T_1$ is not equal to $T_2$ when $T_1$ or $T_2$ is a double bond;

$Y_1$ and $Y_2$ are a pair of substituents selected from the group consisting of H and F and $Y_1=Y_2$;

$Z_1$ and $Z_2$ are a pair of substituents selected from the group consisting of H and F and $Z_1=Z_2$;

$A_1$ and $A_2$ are a pair of substituents selected from the group consisting of H and F and $A_1=A_2$;

at least one of the pairs $Y_1$ and $Y_2$, $Z_1$ and $Z_2$, and $A_1$ and $A_2$ is substituted with F; and, $R_m$ is selected from the group consisting of selected from a group consisting of an alkyl group having the general formula $C_mH_{2m+1}$, an alkenyl group having the general formula $C_mH_{2m-1}$, an alkoxy group having the general formula $OC_mH_{2m+1}$, and an alkenoxy group having the general formula $OC_mH_{2m-1}$, wherein m is an integer greater than 0, and;

wherein when $T_1$ and $T_2$ are both triple bonds and $R_m$ is an alkyl group, one and only one of the pairs $Y_1$ and $Y_2$, $Z_1$ and $Z_2$, and $A_1$ and $A_2$ is substituted with F.

16. A method for preparing liquid crystal compounds, comprising the steps of:

a) reacting an iodobenzene as shown in Structure 1 with trimethylsilyl acetylene in the presence of a catalyst and an amine to produce an trimethylsilylacetyl derivative as shown in structure 2;

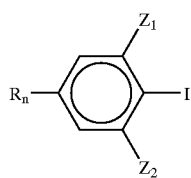
(Structure 1)

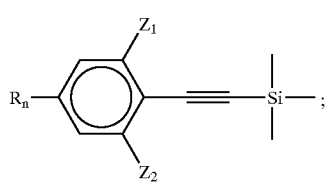
(Structure 2)

b) isolating the trimethylsilylacetyl derivative shown in structure 2 from the reaction of the iodobenzene shown in structure 1 and trimethylsilylacetylene in the presence of the catalyst and the amine;

c) reacting the trimethylsilylacetyl derivative shown in structure 2 with a base to remove trimethyl silane and to give an unsubstituted product as shown in structure 3;

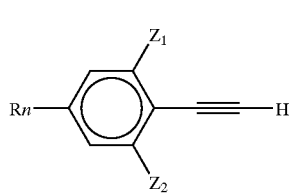
(Structure 3)

d) isolating the unsubstituted product as shown in structure 3 from the reaction of the trimethylsilylacetyl derivative shown in structure 2 with the base;

e) reacting the unsubstituted product as shown in structure 3 with a brominated, substituted benzene as shown in structure 3a to give a tolane product as shown in structure 4;

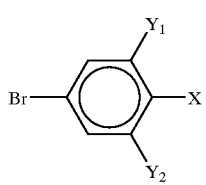
(Structure 3a)

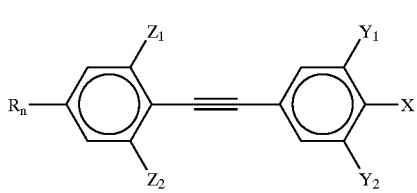
(Structure 4)

f) isolating the tolane product shown in structure 4 from the reaction of the unsubstituted product as shown in structure 3 with the brominated, substituted benzene brominated, substituted benzene shown in structure 3a;

wherein X is selected from the group consisting of F (fluoro), CN (cyano), $OCF_3$ (trifluoromethoxy), and NCS (isothiocyanate);

$T_1$ is a triple bond;

$Y_1$ and $Y_2$ are a pair of substituents selected from the group consisting of H and F, and $Y_1=Y_2$;

$Z_1$ and $Z_2$ are a pair of substituents selected from the group consisting of H and F, and $Z_1=Z_2$; and, at least one of the pairs $Y_1$ and $Y_2$ and $Z_1$ and $Z_2$ is substituted with F;

$R_n$ is selected from the group consisting of an alkyl group having the general formula $C_nH_{2n+1}$, an alkenyl group having the general formula $C_nH_{2n-1}$, an alkoxy group having the general formula $OC_nH_{2n+1}$, an alkenoxy group having the general formula $OC_nH_{2n-1}$, a group of the general structure

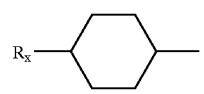

and a group of the general structure

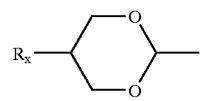

wherein $R_x$ for both structures is selected from a group consisting of an alkyl group having the general formula $C_xH_{2x+1}$, an alkenyl group having the general formula $C_xH_{2x-1}$, an alkoxy group having the general formula $OC_xH_{2x+1}$, and an alkenoxy group having the general formula $OC_xH_{2x-1}$ and wherein n is an integer and x is an integer.

17. The method for preparing liquid crystal compounds as set forth in claim 16, wherein the catalyst in steps a) and e) is $Pd(Ph_3)_2Cl_2/CuI$.

18. The method for preparing liquid crystal compounds as set forth in claim 16, wherein the amine in steps a) and e) is triethylamine.

19. The method for preparing liquid crystal compounds as set forth in claim 16, wherein the base in step c) is NaOH.

20. A method for preparing liquid crystal compounds, comprising the steps of:

a) reacting an iodobenzene as shown in Structure 5 with trimethylsilyl acetylene in the presence of a catalyst and an amine to produce an trimethylsilylacetyl derivative as shown in structure 6;

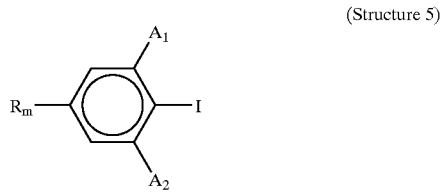
(Structure 5)

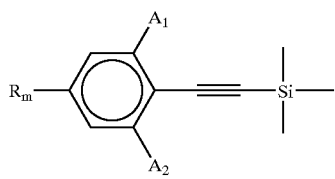
(Structure 6)

b) isolating the trimethylsilylacetyl derivative shown in structure 6 from the reaction of the iodobenzene shown in structure 5 and trimethylsilylacetylene in the present of the catalyst and the amine;
c) reacting the trimethylsilylacetyl derivative shown in structure 6 with a base to remove trimethyl silane and to give an unsubstituted product as shown in structure 7;

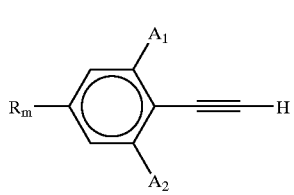
(Structure 7)

d) isolating the unsubstituted product as shown in structure 7 from the reaction of the trimethylsilylacetyl derivative shown in structure 6 with the base;
e) reacting the unsubstuted product as shown in structure 7 with a substituted bromoiodobenzene as shown in structure 7a in the presence of a catalyst, an amine, and triphenylphosphine to prepare a brominated, substituted tolane product shown in structure 8;

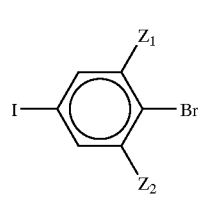
(Structure 7a)

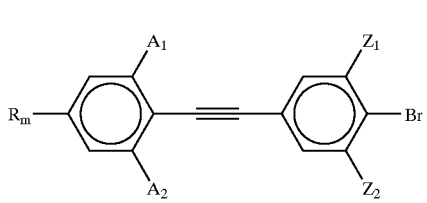
(Structure 8)

f) isolating the brominated, substituted tolane product shown in structure 8 from the reaction of the unsubstuted product as shown in structure 7 with the substituted bromoiodobenzene as shown in structure 7a in the presence of the catalyst, the amine, and triphenylphosphine;
g) reacting the brominated, substituted tolane product shown in structure 8 with trimethylsilylacetylene in the presence of the catalyst, the amine, and triphenylphosphine to produce a trimethylacetyl derivative as shown in structure 9;

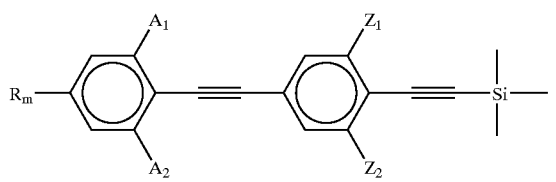
(Structure 9)

h) isolating the trimethylacetyl derivative shown in structure 9 from the reaction of the brominated, substituted tolane product shown in structure 8 with trimethylsilylacetylene in the presence of the catalyst, the amine, and triphenylphosphine;
i) reacting the trimethylsilylacetyl derivative shown in structure 9 with a base to remove trimethylsilane and produce an unsubstituted product as shown in structure 10;

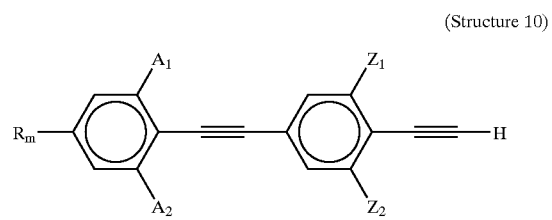
(Structure 10)

j) isolating the unsubstituted product shown in structure 10 from the reaction of the trimethylsilyl derivative shown in structure 9 with the base;
k) reacting the unsubstituted product shown in structure 10 with a substituted bromobenzene as shown in structure 10a in the presence of a catalyst, an amine, and triphenylphosphine to produce a bis-tolane product as shown in structure 11;

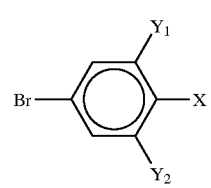
(Structure 10a)

(Structure 11)

l) isolating the bis-tolane product shown in structure 11 from the reaction of the unsubstituted product shown in structure 10 with the substituted bromobenzene shown in structure 10a in the presence of the catalyst, the amine, and triphenylphosphine;
wherein for the structures shown, X is selected from the group consisting of F (fluoro), CN (cyano), $OCF_3$ (trifluoromethoxy), and NCS (isothiocyanate);
$T_1$ is selected from the group consisting of a triple and a double covalent bond between two carbons;

$T_2$ is selected from the group consisting of a triple and a double covalent bond between two carbons; and, $T_1$ is not equal to $T_2$ when $T_1$ or $T_2$ is a double bond;

$Y_1$ and $Y_2$ are a pair of substituents selected from the group consisting of H and F and $Y_1 = Y_2$;

$Z_1$ and $Z_2$ are a pair of substituents selected from the group consisting of H and F and $Z_1 = Z_2$;

$A_1$ and $A_2$ are a pair of substituents selected from the group consisting of H and F and $A_1 = A_2$;

at least one of the pairs $Y_1$ and $Y_2$, $Z_1$ and $Z_2$, and $A_1$ and $A_2$ is substituted with F; and, $R_m$ is selected from the group consisting of selected from a group consisting of an alkyl group having the general formula $C_m H_{2m+1}$, an alkenyl group having the general formula $C_m H_{2m-1}$, an alkoxy group having the general formula $OC_m H_{2m+1}$, and an alkenoxy group having the general formula $OC_m H_{2m-1}$ and wherein m is an integer.

21. The method for preparing liquid crystal compounds as set forth in claim 20, wherein the catalyst in steps a), e), g), and k) is $Pd(Ph_3)_2 Cl_2/CuI$.

22. The method for preparing liquid crystal compounds as set forth in claim 20, wherein the amine in steps a), e), g), and k) is triethylamine.

23. The method for preparing liquid crystal compounds as set forth in claim 20, wherein the base in steps c) and i) is NaOH.

* * * * *